United States Patent
Melancon et al.

(10) Patent No.: US 12,260,370 B1
(45) Date of Patent: Mar. 25, 2025

(54) SYSTEM TO PREDICT SERVICE LEVEL FAILURE IN SUPPLY CHAINS

(71) Applicant: JDA Software Group, Inc., Scottsdale, AZ (US)

(72) Inventors: Gabrielle Gauthier Melancon, Montréal (CA); Philippe Grangier, Montréal (CA); Eric Prescott-Gagnon, Montréal (CA); Emmanuel Sabourin, Uden (NL)

(73) Assignee: Blue Yonder Group, Inc., Scottsdale, AZ (US)

( * ) Notice: Subject to any disclaimer, the term of this patent is extended or adjusted under 35 U.S.C. 154(b) by 890 days.

(21) Appl. No.: 16/193,547

(22) Filed: Nov. 16, 2018

(51) Int. Cl.
*G06Q 10/083* (2024.01)
*G06F 17/18* (2006.01)
*G06N 20/00* (2019.01)
*G06Q 10/0635* (2023.01)

(52) U.S. Cl.
CPC ......... *G06Q 10/0838* (2013.01); *G06F 17/18* (2013.01); *G06N 20/00* (2019.01); *G06Q 10/0635* (2013.01)

(58) Field of Classification Search
CPC .......... G06Q 10/0838; G06Q 10/0635; G06N 20/00; G06F 17/18
USPC ...................................................... 705/341
See application file for complete search history.

(56) References Cited

U.S. PATENT DOCUMENTS

| | | | |
|---|---|---|---|
| 8,700,443 B1 * | 4/2014 | Murray | G06Q 10/087 705/7.31 |
| 2005/0197952 A1 * | 9/2005 | Shea | G06Q 40/08 705/38 |
| 2009/0248488 A1 * | 10/2009 | Shah | G06Q 10/0635 705/7.28 |
| 2013/0110399 A1 * | 5/2013 | Moss | G06F 17/18 702/3 |

(Continued)

FOREIGN PATENT DOCUMENTS

WO   WO-2020093144 A1 *   5/2020   ............. G06N 20/00

OTHER PUBLICATIONS

Sanjoy Kumar Paul, Ruhul Sarker, Daryl Essam, A quantitative model for disruption mitigation in a supply chain, European Journal of Operational Research, vol. 257, Issue 3, https://doi.org/10.1016/j.ejor.2016.08.035 (Year: 2017).*

*Primary Examiner* — George Chen
*Assistant Examiner* — Lisa Ma
(74) *Attorney, Agent, or Firm* — Spencer Fane LLP; Steven J. Laureanti

(57) ABSTRACT

A system and method are disclosed for a low-touch centralized system to predict service level failure in a supply chain using machine learning. Embodiments include receiving only historical supply chain data from an archiving system for one or more supply chain entities storing items at stocking locations, predicting one or more supply chain events during a prediction period by applying a predictive model to a sample of historical supply chain data, calculating an occurrence risk score for at least one of the one or (Continued)

more supply chain events and indicating a possibility that the at least one of the one or more supply chain events will occur, generating one or more alerts identifying at least one item and at least one alert stocking location, rendering an alert heatmap visualization comprising one or more selectable user interface elements, and provide one or more tools for initiating corrective actions to be undertaken.

20 Claims, 10 Drawing Sheets

(56) References Cited

U.S. PATENT DOCUMENTS

| | | | | |
|---|---|---|---|---|
| 2014/0218389 | A1* | 8/2014 | Bennett | G06F 21/577 |
| | | | | 345/593 |
| 2015/0046363 | A1* | 2/2015 | McNamara | G06Q 10/0833 |
| | | | | 705/333 |
| 2018/0046926 | A1* | 2/2018 | Achin | G06F 9/5011 |
| 2018/0046940 | A1* | 2/2018 | Hummel | G06N 20/00 |
| 2018/0197128 | A1* | 7/2018 | Carstens | G06F 16/9024 |
| 2019/0213509 | A1* | 7/2019 | Burleson | G06N 20/00 |
| 2020/0134545 | A1* | 4/2020 | Appel | G06Q 10/04 |
| 2020/0202171 | A1* | 6/2020 | Hughes | G06F 8/36 |
| 2021/0241347 | A1* | 8/2021 | Sridhar | G06Q 30/0631 |
| 2022/0207606 | A1* | 6/2022 | Dickie | G06N 20/20 |

* cited by examiner

SYSTEM TO PREDICT SERVICE LEVEL FAILURE IN SUPPLY CHAINS

TECHNICAL FIELD

The present disclosure relates generally to supply chain management and specifically to systems and methods for predicting and preventing service level failures in a supply chain.

BACKGROUND

Although a goal of supply chain planning is to generate globally-optimized supply chain plans for an entire business, the calculation and execution of supply chain plans is typically controlled by several distinct and dissimilar processes, including, for example, demand planning, production planning, supply planning, distribution planning, execution, and the like. Each of these processes may have differing data requirements and planning periods which makes synchronizing the processes difficult. Often a demand or production variation is detected after the planning period of one or more processes and prevents generating a globally-optimized plan that accounts for the variation. The failure to account for variation in the globally optimized plan may cause service failures and prevents achieving customer service level targets. This result is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
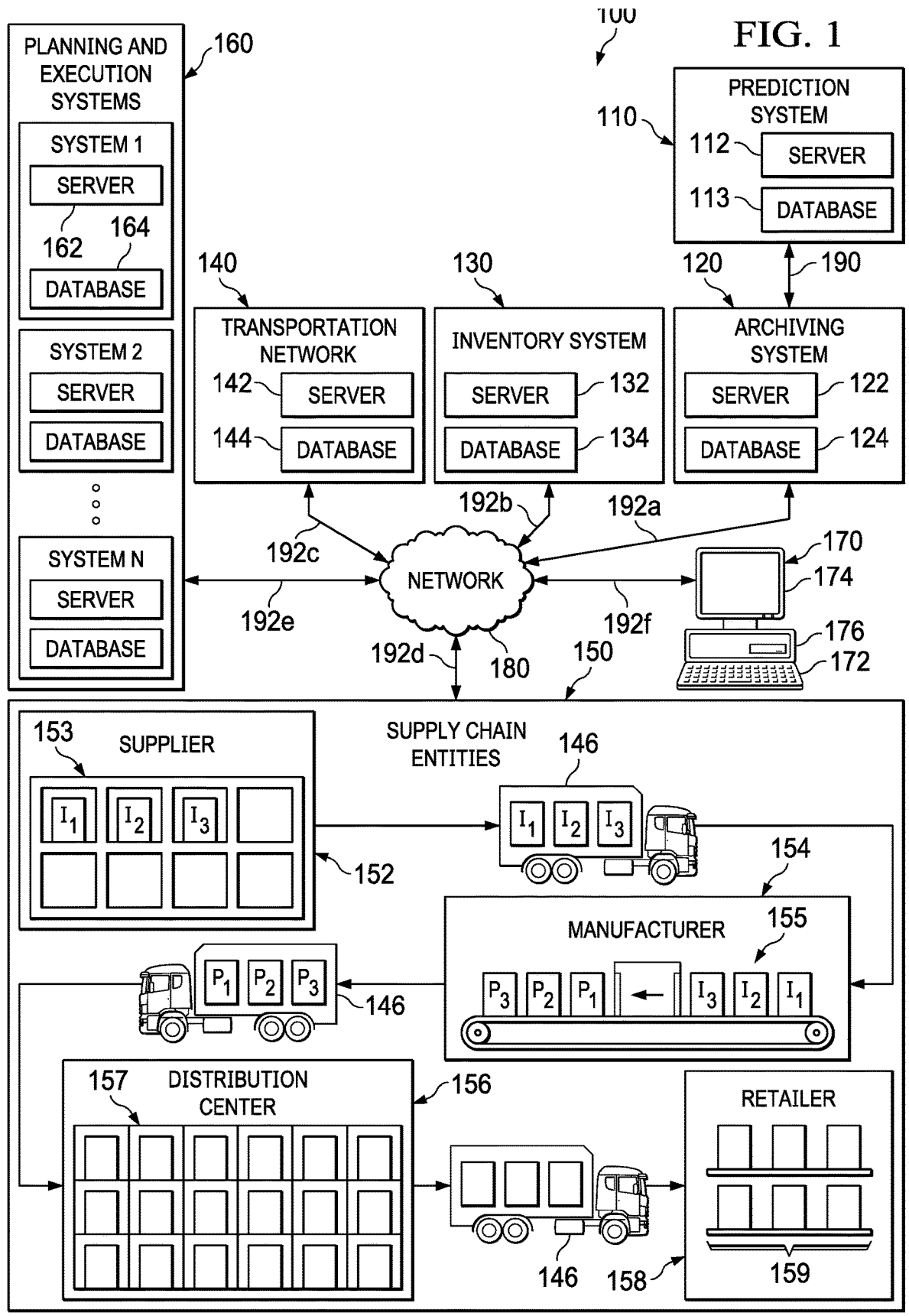
FIG. 1 illustrates an exemplary supply chain network, according to an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Supply chains often fail to fully meet the intended targets set by a supply chain plan or may need to adjust to elements that had not been forecasted in the initial plan. Each of the supply chain planning and execution processes may have differing data requirements and planning periods which prevents fully synchronizing the various planning and execution processes of the supply chain. When particular changes or events occur, such as a sudden change in demand or production, a transportation delay, and/or one or more shipping problems, the new situation of the supply chain may be detected too late to generate a new plan that accounts for the events. However one or more supply chain planners may still be able to take actions that would prevent a failure that would otherwise be caused by this situation. As such, with a system that identifies situations at risk within the planning horizon a business can have a prescriptive approach (preventing problems before they occur) as opposed to what is ordinarily done, where a business reacts to failures only once they have already occurred.

Embodiments disclosed below apply machine learning techniques to archived supply chain data to predict supply chain failures before they occur, generate alerts and contextual visualizations that identify the underlying causes of the predicted failure, and provide situational awareness of the past and predicted state of the supply chain affected by the predicted failure. Some embodiments of the disclosed system generate alerts for predicted supply chain failures for current and future time periods but without using real-time data and without access to production system or transportation management system rules. As described in more detail below, by using only historical supply chain data, embodiments predict supply chain events without aligning data or event models, and without integration with planning and execution processes, which reduces implementation time and costs.

FIG. 1 illustrates exemplary supply chain network 100, according to an embodiment. In one embodiment, supply chain network 100 comprises prediction system 110, archiving system 120, inventory system 130, transportation network 140, one or more supply chain entities 150, one or more planning and execution systems 160, computer 170, network 180, and communication links 190 and 192a-192f. Although a single prediction system 110, a single archiving system 120, a single inventory system 130, a single transportation network 140, one or more supply chain entities 150, one or more planning and execution systems 160, a single computer 170, and a single network 180 are shown and described, embodiments contemplate any number of prediction systems, archiving systems, inventory systems, transportation networks, supply chain entities, planning and execution systems, computers, or networks, according to particular needs.

In one embodiment, prediction system 110 comprises server 112 and database 114. As described in more detail below, prediction system 110 models predictions of supply chain failures (such as, for example, service level failures, future stock outs, returns, and the like) as a classification problem using model based on a suitable machine learning method (such as, for example, gradient boosted trees or neural networks), trains the model with snapshots of historical supply chain data, and predicts supply chain failures for future time periods by passing snapshots of recent supply chain data to the trained model. According to some embodiments, prediction system 110 generates alerts for the predicted supply chain failures that occur too late to be included on a current plan but before the time period covered by the next plan. In addition, server 112 comprises one or more modules that receive predictions for supply chain failures and generate alerts that identify the item, location, and time of the predicted supply chain failure much earlier than the failure may actually occur, which provides an opportunity for one or more supply chain entities 150 to prevent a supply chain failure by, for example, initiating one more levers, such as, for example, changing safety stock, adjusting a forecast, updating one or more planning values, and the like. As described in more detail below, some embodiments of prediction system 110 filter, hide, and sort alerts to prioritize alerts related to, for example, important customers, high-value or large-volume products, and de-prioritize alerts that are redundant or unneeded. In addition, prediction system 110 renders for display contextual supply chain data that provides situational awareness of the past and predicted state of one or more supply chain entities 150 associated with each alert, including, for example, order timing and quantity, inventory levels, the quantity or percentage of on-time shipments, and other supply chain measurements, as described in more detail below.

Archiving system 120 of supply chain network 100 comprises server 122 and database 124. Although archiving system 120 is shown as comprising a single server 122 and a single database 124, embodiments contemplate any suitable number of servers or databases internal to or externally coupled with archiving system 120. Server 122 of archiving system 120 may support one or more processes for receiving historical supply chain data from one or more supply chain planning and execution processes 160. Archiving system 120 may be integrated directly with each of the one or more planning and execution systems 160. In addition or in the alternative, archiving system 120 comprises an external component that receives and stores historical supply chain data, including current and past planning data, from each of the one or more planning and execution systems 160. As discussed above, prediction system 110 receives historical supply chain data from only archiving system 120 and not directly from any of one or more planning and execution systems 160.

Historical supply chain data stored by archiving system 120 may comprise, for example, sales data, forecast data, inventory data, stock levels, safety stock levels, forecast production, logistics operations, such as, for example, the predicted time to ship a product from a first location to a second location, actual shipping times for past shipments, production plans, actual production, store data (including sales numbers (e.g. number of sales over the past week), the start level at the store, the quality of the forecasts for a store), data from one or more planning and execution systems 140, including, for example, a transportation management system (TMS), a warehouse management system (WMS), fulfillment system, procurement system, production systems, and the like. The inventory data may comprise current or projected inventory quantities or states, the current level of inventory for products at one or more stocking points across the supply chain network, order rules that describe one or more rules or limits on setting an inventory policy, including, but not limited to, a minimum order quantity, a maximum order quantity, a discount, a step-size order quantity, and batch quantity rules.

Server 122 may store the received historical supply chain data in database 124. Database 124 of archiving system 120 may comprise one or more databases or other data storage arrangement at one or more locations, local to, or remote from, server 122 storing supply chain data of the supply chain network 100.

According to an embodiment, one or more planning and execution systems 160 comprise server 162 and database 164. As described above, supply chain planning and execution is typically performed by several distinct and dissimilar processes, including, for example, demand planning, production planning, supply planning, distribution planning, execution, transportation management, warehouse management, fulfilment, and the like. Server 162 of one or more planning and execution systems 160 comprises one or more modules, such as, for example, a planning module, a solver, a modeler, and/or an engine, for performing actions of one or more planning and execution processes. Server 162 stores and retrieves supply chain data from database 164 or from one or more locations in supply chain network 100. In addition, one or more planning and execution systems 160 operate on one or more computers 170 that are integral to or separate from the hardware and/or software that support archiving system 120, inventory system 130, transportation network 140, and one or more supply chain entities 150.

Inventory system 130 comprises server 132 and database 134. Server 132 of inventory system 130 is configured to receive and transmit item data, including item identifiers, pricing data, attribute data, inventory levels, and other like data about one or more items at one or more locations in the supply chain network 100. Server 132 stores and retrieves item data from database 134 or from one or more locations in supply chain network 100. Each item may be represented in supply chain network 100 by an identifier, including, for example, Stock-Keeping Unit (SKU), Universal Product Code (UPC), serial number, barcode, tag, a radio-frequency identification (RFID) tag, or like objects that encode identifying information and which may be scanned to read the encoded information and at least partially identified based on the scan. This may include, for example, a stationary scanner located at one or more supply chain entities 150 that scans items as the items pass near the scanner such as, for example, a point of sale system at one or more retailers that records transactions and associates the transactions with product data, including, for example, associating customer identity information, store identity and location, market information, time information, price information, discount information, and the like, as described in more detail herein. Embodiments also include, for example, a scanner located at one or more stocking locations of one or more supply chain entities 150 that automatically identifies when an item is received into or removed from the one or more stocking locations.

Transportation network 140 comprises server 142 and database 144. According to embodiments, transportation network 140 directs one or more transportation vehicles 146 to ship one or more items between one or more supply chain entities 150, based, at least in part, on a predicted supply chain event, predicted order promise failure, predicted service level failure, an inventory policy, target service levels, the number of items currently in stock at one or more supply chain entities 150, the number of items currently in transit in the transportation network 140, forecasted demand, a supply chain disruption, and/or one or more other factors described herein. Transportation vehicles 146 comprise, for example, any number of trucks, cars, vans, boats, airplanes, unmanned aerial vehicles (UAVs), cranes, robotic machinery, or the like. Transportation vehicles 146 may comprise radio, satellite, or other communication that communicates location information (such as, for example, geographic coordinates, distance from a location, global positioning satellite (GPS) information, or the like) with prediction system 110, archiving system 120, inventory system 130, transportation network 140, one or more supply chain entities 150, and/or one or more planning and execution systems 160 to identify the location of transportation vehicle 146 and the location of any inventory or shipment located on transportation vehicle 146.

As shown in FIG. 1, supply chain network 100 operates on one or more computers 170 that are integral to or separate from the hardware and/or software that support prediction system 110, archiving system 120, inventory system 130, transportation network 140, one or more supply chain entities 150, and one or more planning and execution systems 160. Supply chain network 100 comprising prediction system 110, archiving system 120, inventory system 130, transportation network 140, one or more supply chain entities 150, and/or one or more planning and execution systems 160 may operate on one or more computers 170 that are integral to or separate from the hardware and/or software that support prediction system 110, archiving system 120, inventory system 130, transportation network 140, one or more supply chain entities 150, and one or more planning and execution systems 160. Computers 170 may include any suitable input device 172, such as a keypad, mouse, touch screen, microphone, or other device to input information. Output device 174 may convey information associated with the operation of supply chain network 100, including digital or analog data, visual information, or audio information. Computer 170 may include fixed or removable computer-readable storage media, including a non-transitory computer readable medium, magnetic computer disks, flash drives, CD-ROM, in-memory device or other suitable media to receive output from and provide input to supply chain network 100.

Computer 170 may include one or more processors 176 and associated memory to execute instructions and manipulate information according to the operation of supply chain network 100 and any of the methods described herein. In addition, or as an alternative, embodiments contemplate executing the instructions on computer 170 that cause computer 170 to perform functions of the method. Further examples may also include articles of manufacture including tangible non-transitory computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from, prediction system 110, archiving system 120, inventory system 130, transportation network 140, one or more supply chain entities 150, and one or more planning and execution systems 160. In addition, each of the one or more computers 170 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with the prediction system 110, archiving system 120, inventory system 130, transportation network 140, one or more supply chain entities 150, and/or one or more planning and execution systems 160. These one or more users may include, for example, a "manager" or a "planner" handling supply chain planning, actions following supply chain disruptions, actions in response to alerts for predicted supply chain failures, and/or one or more related tasks within supply chain network 100. In addition, or as an alternative, these one or more users within supply chain network 100 may include, for example, one or more computers programmed to autonomously handle, among other things, determining an assortment plan, demand forecasting demand, supply and distribution planning, inventory management, allocation planning, order fulfilment, adjustment of manufacturing and inventory levels at various stocking points and distribution centers, and/or one or more related tasks within supply chain network 100.

One or more supply chain entities 150 represent one or more supply chain networks, including one or more enterprises, such as, for example networks of one or more suppliers 152, manufacturers 154, distribution centers 156, retailers 158 (including brick and mortar and online stores), customers, and/or the like. Suppliers 152 may be any suitable entity that offers to sell or otherwise provides one or more items (i.e., materials, components, or products) to one or more manufacturers 154. Suppliers 152 may comprise automated distribution systems 153 that automatically transport products to one or more manufacturers 154 based, at least in part, on one or more predicted supply chain failures, one or more corrective actions initiated to prevent a predicted failure, and/or one or more other factors described herein.

Manufacturers 154 may be any suitable entity that manufactures at least one product. Manufacturers 154 may use one or more items during the manufacturing process to produce any manufactured, fabricated, assembled, or otherwise processed item, material, component, good, or product. In one embodiment, a product represents an item ready to be supplied to, for example, one or more supply chain entities 150 in supply chain network 100, such as retailers 158, an item that needs further processing, or any other item. Manufacturers 154 may, for example, produce and sell a product to suppliers 152, other manufacturers 154, distribution centers 156, retailers 158, a customer, or any other suitable person or entity. Manufacturers 154 may comprise automated robotic production machinery 155 that produce products based, at least in part, on one or more predicted supply chain failures, one or more corrective actions initiated to prevent a predicted failure, one or more alerts, and/or one or more other factors described herein.

Distribution centers 156 may be any suitable entity that offers to store or otherwise distribute at least one product to one or more retailers 158 and/or customers. Distribution centers 156 may, for example, receive a product from a first one or more supply chain entities 150 in supply chain network 100 and store and transport the product for a second one or more supply chain entities 150. Distribution centers 156 may comprise automated warehousing systems 157 that automatically remove products from and place products into inventory based, at least in part, on one or more predicted supply chain failures, one or more corrective actions initiated to prevent a predicted failure, one or more alerts, and/or one or more other factors described herein.

Retailers 158 may be any suitable entity that obtains one or more products to sell to one or more customers. Retailers 158 may comprise any online or brick-and-mortar store, including stores with shelving systems 159. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of retailers 158 based on computer-generated instructions or automatically by machinery to place products in a desired location in retailers 158 and which may be based, at least in part, on one or more predicted supply chain failures, one or more corrective actions initiated to prevent a predicted failure, one or more alerts, and/or one or more other factors described herein. Although one or more supply chain entities 150 are shown and described as separate and distinct entities, the same entity may simultaneously act as any one of the one or more supply chain entities 150. For example, one or more supply chain entities 150 acting as a manufacturer can produce a product, and the same one or more supply chain entities 150 can act as a supplier to supply an item to itself or another one or more supply chain entities 150. Although one example of a supply chain network 100 is shown and described, embodiments contemplate any configuration of supply chain network 100, without departing from the scope described herein.

In one embodiment, prediction system 110 may be coupled with archiving system 120 using communication link 190, which may be any wireline, wireless, or other link suitable to support data communications between prediction system 110 and archiving system 120 during operation of the system. In addition, archiving system 120 may be coupled with network 180 using communication link 192a, which may be any wireline, wireless, or other link suitable to support data communications between archiving system 120 and network 180 during operation of the system. Inventory system 130 may be coupled with network 180 using communication link 192b which may be any wireline, wireless, or other link suitable to support data communications between inventory system 130 and network 180 during operation of the system. Transportation network 140 may be coupled with network 180 using communication link 192c, which may be any wireline, wireless, or other link suitable to support data communications between transportation network 140 and network 180 during operation of the system. One or more supply chain entities 150 may be coupled with network 180 using communication link 192d, which may be any wireline, wireless, or other link suitable to support data communications between one or more supply chain entities 150 and network 180 during operation of the system. One or more planning and execution systems 160 may be coupled with network 180 using communication link 192e, which may be any wireline, wireless, or other link suitable to support data communications between one or more planning and execution systems 160 and network 180 during operation of the system. Computer 170 may be coupled with network 180 using communication link 192f, which may be any wireline, wireless, or other link suitable to support data communications between computer 170 and network 180 during operation of the system.

Although communication links 192a-192f are shown as generally coupling archiving system 120, inventory system 130, transportation network 140, one or more supply chain entities 150, one or more planning and execution systems 160, and computer 170 to network 180, any of archiving system 120, inventory system 130, transportation network 140, one or more supply chain entities 150, one or more planning and execution systems 160, and computer 170 may communicate directly with each other, according to particular needs.

In another embodiment, network 180 includes the Internet and any appropriate local area networks (LANs), metropolitan area networks (MANs), or wide area networks (WANs) coupling archiving system 120, inventory system 130, transportation network 140, one or more supply chain entities 150, one or more planning and execution systems 160, and computer 170.

For example, data may be maintained locally to, or externally of, archiving system 120, inventory system 130, transportation network 140, one or more supply chain entities 150, one or more planning and execution systems 160, and computer 170 and made available to one or more associated users of archiving system 120, inventory system 130, transportation network 140, one or more supply chain entities 150, one or more planning and execution systems 160, and computer 170 using network 180 or in any other appropriate manner. For example, data may be maintained in a cloud database at one or more locations external to archiving system 120, inventory system 130, transportation network 140, one or more supply chain entities 150, one or more planning and execution systems 160, and computer 170 and made available to one or more associated users of archiving system 120, inventory system 130, transportation network 140, one or more supply chain entities 150, one or more planning and execution systems 160, and computer 170 using the cloud or in any other appropriate manner. Those skilled in the art will recognize that the complete structure and operation of network 180 and other components within supply chain network 100 are not depicted or described. Embodiments may be employed in conjunction with known communications networks and other components.

In accordance with the principles of embodiments described herein, prediction system 110 may generate alerts for predicted supply chain failures, such as an order promising failure or service level failure, that will occur during a current or future period but which will not be accounted for in a supply chain plan. Based on the alert, a supply chain planner accessing one or more planning and execution systems 160 may initiate an action to prevent the supply chain failure. Based on the selected corrective action, the one or more planning and execution systems 160 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities, and the configuration and quantity of packaging and shipping of products and taking into account the current inventory or production levels at one or more supply chain entities 150. For example, the selected corrective action to prevent a predicted supply chain failure associated with an alert generated by the prediction system 110 may comprise adding items to or removing items from a shipment of one or more supply chain entities 150.

Figure 2:
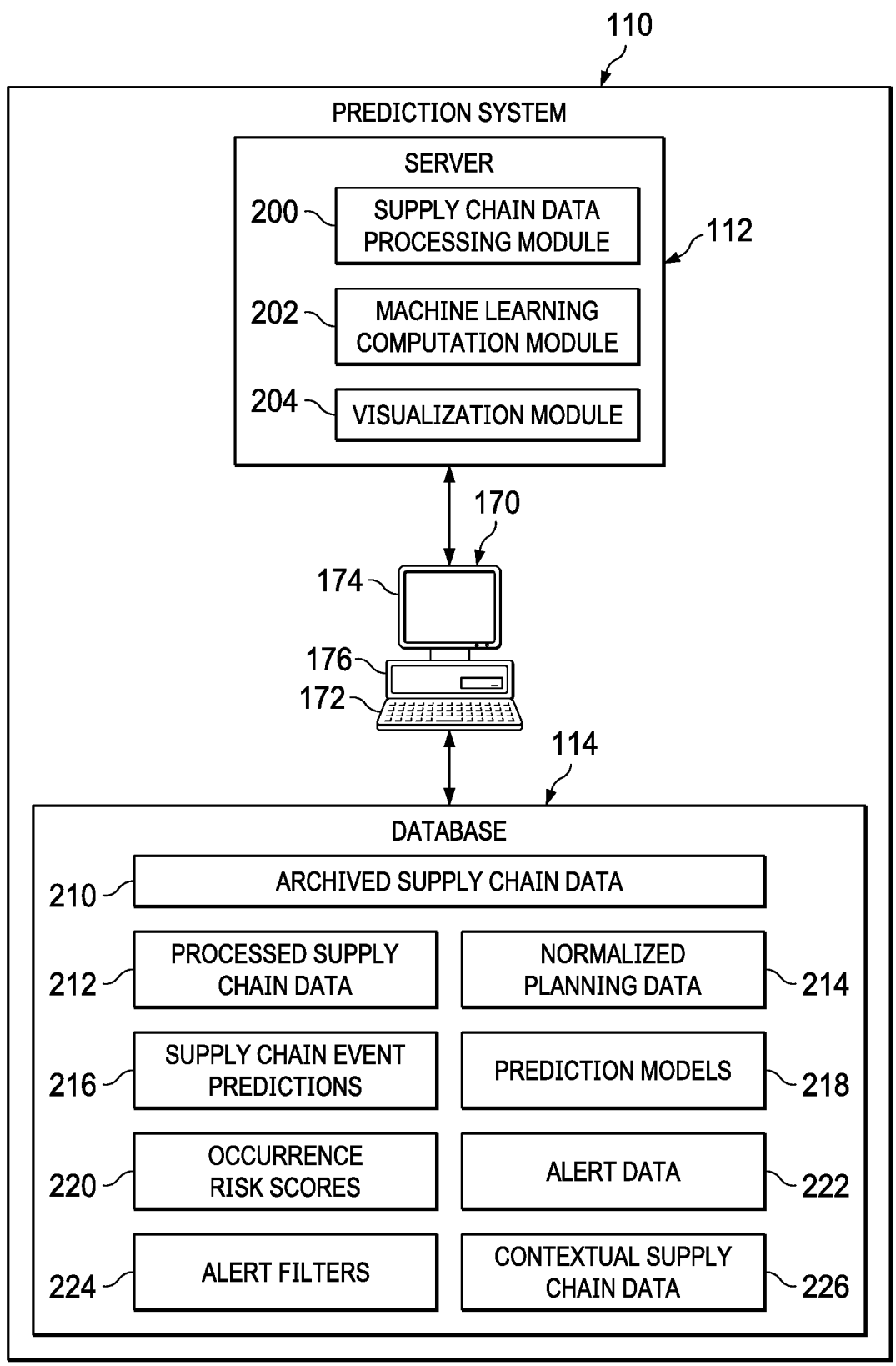
FIG. 2 illustrates the prediction system of FIG. 1 in more detail, in accordance with an embodiment.

FIG. 2 illustrates prediction system 110 of FIG. 1 in more detail, in accordance with an embodiment. As discussed above, prediction system 110 may comprise one or more computers 170 at one or more locations including associated input devices 172, output devices 174, non-transitory computer-readable storage media, processors 176, memory, or other components for receiving, processing, storing, and communicating information according to the operation of supply chain network 100. Additionally, prediction system 110 comprises server 112 and database 114. Although prediction system 110 is shown as comprising a single computer 170, a single server 112, and a single database 114, embodiments contemplate any suitable number of computers, servers, or databases internal to or externally coupled with prediction system 110.

Server 112 of prediction system 110 comprises supply chain data processing module 200, machine learning computation module 202, and visualization module 204. Although server 112 is shown and described as comprising a single supply chain data processing module 200, a single machine learning computation module 202, and a single visualization module 204, embodiments contemplate any suitable number or combination of these located at one or more locations, local to, or remote from prediction system 110.

Database 114 of prediction system 110 may comprise one or more databases or other data storage arrangement at one or more locations, local to, or remote from, server 112. Database 114 of prediction system 110 comprises, for example, archived supply chain data 210, processed supply chain data 212, normalized planning data 214, prediction models 216, supply chain event predictions 218, occurrence risk scores 220, alert data 222, alert filters 224, and contextual supply chain data 226. Although database 114 is shown and described as comprising archived supply chain data 210, processed supply chain data 212, normalized planning data 214, prediction models 216, supply chain event predictions 218, occurrence risk scores 220, alert data 222, alert filters 224, and contextual supply chain data 226, embodiments contemplate any suitable number or combination of these, located at one or more locations, local to, or remote from, prediction system 110 according to particular needs.

In one embodiment, supply chain data processing module 200 of prediction system 110 receives archived supply chain data 210 from archiving system 120, stores the received archived supply chain data 210 at database 114, and processes the archived supply chain data 210 for use in a prediction problem solved by one or more machine learning techniques to predict one or more supply chain failure. Supply chain data processing module 200 prepares archived supply chain data 210 for use in a prediction problem by checking archived supply chain data 210 for errors and transforming processed archived supply chain data 212. Supply chain data processing module 200 may check supply chain data for errors in the range, sign, and/or value of the received data and use statistical analysis to check the quality or the correctness of the data. According to embodiments, supply chain data processing module 200 transforms the supply chain data to normalize, aggregate, and/or rescale the supply chain data to allow direct comparison of supply chain data from different planning and execution systems 160. According to embodiments, supply chain data processing module 200 transforms archived supply chain data 210 by one or more of rescaling, normalization, and/or aggregation processes to, for example, aggregate one or more variables (inventory level, forecast, logistics delays, production quantity, etc.) at the same granularity level; express all quantities in terms of a ratio of the original quantity divided by the plan quantity, computation of quantity independent key performance indicators (such as, for example, past service level in % per week), and the like.

In one embodiment, machine learning computation module 202 predicts one or more supply chain events using a machine learning model trained with historical supply chain data after processing and transformation by supply chain data processing module 200. Machine learning computation module 202 may predict a service level failure using a binary classification problem to assess if a future service level is either above a targeted service level (1) or not above a targeted service level (0). Machine learning computation module 202 may solve the problem as a classification problem using machine learning techniques (neural networks, gradient boosted trees, or the like). For example, machine learning computation module 202 may train the machine learning model using one or more years of archived supply chain data 210, presented in snapshots comprising smaller time periods of the data, to predict the occurrence of supply chain failures during a period subsequent to the snapshot time period. After training the machine learning model, machine learning computation module 202 may, when presented with snapshots of supply chain data, predict the occurrence of supply chain failures during a period subsequent to the snapshot time period. In embodiments machine learning computation module 202 trains the machine learning model with transformed historical supply chain data aggregated at a certain granularity level. The granularity level may comprise, for example, data aggregated by item, stocking location, and time period for one or more planning periods, such as, for example, data aggregated by SKU-week, for a planning period of four-weeks. Machine learning computation module 202 may train the machine learning model using four-week snapshots of supply chain data to predict supply chain events during the subsequent three-week period. Machine learning computation module 202 may predict future supply chain events at weekly intervals. However, embodiments contemplate shorter prediction phases that may be performed, for example, twice a week, once a day, or the like. In addition, machine learning computation module 202 predicts supply chain events that occur only within a prediction horizon. A prediction horizon comprises a length of time long enough for one or more supply chain entities 150 to enact a corrective action for the predicted supply chain event and shorter than the planning horizon. According to embodiments, machine learning computation module 202 sets the prediction horizon to a time period shorter than a time period when supply chain events would be detected and accounted for by a planning system of one or more planning and execution systems 160.

Machine learning computation module 202 may associate one or more metrics, such as, for example, probability of occurrence or the like, with each of the one or more predicted supply chain failures. Machine learning computation module 202 may derive these metrics from the training of the machine learning model for example by using statistical performance (such as Precision/Recall or Receiver Operating Characteristics). During a prediction phase of the machine learning process, machine learning computation module 202 calculates a value between 0 and 1 for each snapshot. This value is not directly interpretable in terms of probability of occurrence, however the closer the value is to 1, the more likely the situation is to correspond to a failure. To derive a probability of occurrence, machine learning computation module 202 analyzes the past performance of calculated values for the predicted supply chain failures. For example, during a training phase of machine learning, the machine learning computation module may analyze the occurrence prediction for an output value of, for example, 0.8. If 50% of the snapshots labelled with a value greater than 0.8 resulted in a supply chain failures two weeks later, then the probability of occurrence is 50% when operating at 0.8. The calculated probability of occurrence based on the output value for a snapshot is termed occurrence risk score. In addition, visualization module 204 may generate a visualization of the contribution of each prediction feature to the output value or the risk score, which may be used to identify which supply chain systems need to be adjusted to prevent predicted the supply chain failure.

In one embodiment, visualization module 204 of prediction system 110 comprises a user interface (UI), including a graphical user interface (GUI), that displays one or more interactive visualizations including, for example, a heatmap showing the occurrence risk of predicted supply chain failures, stocking location of an item associated with the event, and distribution region for the item. Visualization module 204 may also render visualisations that include graphs, charts, and other graphics illustrating supply chain features associated with the predicted supply chain failures, probabilities that the supply chain failures will occur, and the importance of various factors in determining the occurrence probabilities. The visualizations are constructed from data received from machine learning computation module 202 and is updated with contextual data received from supply chain data processing module 200.

In one embodiment, supply chain data processing module 200 of prediction system 110 retrieves contextual data for display in one or more visualizations and stores the retrieved contextual data as contextual supply chain data 226 of database 114. Supply chain data processing module 200 identifies historical supply chain data associated with one or more features used by prediction system 110 to predict a supply chain event, (i.e. the values of the features increase or decrease the probability of occurrence of predicted supply chain failures), retrieves the identified data from prediction system 110 and/or archiving system 120, and stores the data as contextual supply chain data 226. In addition, supply chain data processing module 200 may identify one or more supply chain components associated with a predicted supply chain failure such as, for example, a SKU, a stocking location, one or more supply chain entities 150, a distribution channel, a sales region, a resource, a material, or the like, and retrieve data associated with the predicated supply chain event from one or more of database 114 of prediction system 110, database 124 of archiving system 120, and/or one or more other locations local to or remote from supply chain network 100. Visualization module 204 processes the retrieved contextual supply chain data 227 to create visualizations illustrating various aspects of the variables used to make the supply chain failure predictions and provide context of the past, current, and future states of the supply chain network 100.

The various types of data stored in database 114 of prediction system 110 will now be discussed.

Archived supply chain data 210 may comprise data received from archiving system 120, as well as archives of all processed, normalized, or generated data from prediction system 110.

Processed supply chain data 212 comprises historical supply chain data processed by supply chain data processing module 200 of prediction system 110 and checked for correct range, sign, value, and the like. Processed supply chain data 212 may comprise statistical analysis of the data, including checks of the quality or correctness of the data, or other statistics generated from the processed supply chain data 212.

Normalized planning data 214 comprises supply chain data rescaled and transformed by machine learning computation module 202 and stored in database 114 of prediction system 110. Machine learning systems typically cannot directly apply machine learning techniques to raw or unprocessed supply chain data. Instead, the supply chain data is normalized to be, for example, quantity independent, where the supply chain data has the same meaning independent of the quantity of an item sold, which may then be rescaled to compare data of different scopes. According to embodiments, supply chain data processing module 200 transforms the supply chain data to normalize, aggregate, and/or rescale the supply chain data to allow direct comparison of supply chain data from different planning and execution systems 160. According to embodiments, supply chain data processing module 200 transforms processed supply chain data 212 by one or more of rescaling, normalization, and/or aggregation processes to, for example, aggregate one or more variables (inventory level, forecast, logistics delays, production quantity, etc.) at the same granularity level; express all quantities in terms of a ratio of the original quantity divided by the plan quantity, computation of quantity independent key performance indicators (such as, for example, past service level in % per week), and the like.

Prediction models 216 comprise machine learning models trained from historical supply chain data to predict future supply chain failures. For example, machine learning computation module 202 may train a machine learning model using one or more years of archived supply chain data 210, presented in snapshots comprising smaller time periods of the data, to predict the occurrence of supply chain failure during a period subsequent to the snapshot time period. After training the machine learning model, machine learning computation module 202 may, when presented with snapshots of supply chain data, predict the occurrence of supply chain failures during a period subsequent to the snapshot time period by applying the trained machine learning model.

Supply chain event predictions 218 comprise failures predicted to occur during a current or future time period when the value of a supply chain metric will not meet a selected targeted value. By way of example and not of limitation, a supply chain failure may comprise an order promising failure that occurs when a business is unable to deliver an item within a promised time period.

Supply chain event scores 220 comprise the calculated probabilities that one or more supply chain failures will occur. Prediction system 110 may calculate the probability that a particular supply chain failure will occur using processed archive supply chain data 210 and supply chain failure predictions 218, as discussed in more detail below. In one embodiment, prediction system 110 analyzes values generated by the prediction problem and calculates the probability that the target will be met based on the performance of the values for predicting supply chain failures using the prediction model. Each time prediction system 110 trains the prediction model and generates new predictions of supply chain failures, prediction system 110 calculates the performance of the model and uses the performance to update the supply chain event scores 220 for the predicated supply chain failures. By way of example and not by way of limitation, supply chain failure scores 220 may comprise probabilities of occurrence, or risk of occurrence, for a supply chain failure comprising a service level failure, such as that caused by failing to meet a promised delivery time, by analyzing past performance of calculations made during prediction phases of a machine learning process using, for example, a precision value and/or a recall value, as described in more detail below.

Alert data 222 comprises alerts generated by the prediction system 110 to represent an output value whose metrics indicate a greater than 50% chance of occurring. According to embodiments, prediction system 110 analyzes supply chain event predictions 218, and generates alerts for each unique combination of item and stocking location that is predicted to cause a service level failure during the prediction period. As described in more detail below, the item-stocking location combination of the alert is used to create a visualization of alerts that is ordered across one axis by SKU and across a second axis by a location. Although alerts are described as being generated for each unique item/stocking location combination that is predicted to cause a service level failure, embodiments contemplate alerts generated for each SKU or other characteristic or combination of characteristics of predicted supply chain events.

Alert filters 224 comprise a set of rules or, by way of example, a file which for each item location combination presents a list of already known facts which cause visualization module 204 of prediction system 110 to deprioritize or not display alerts for one or more supply chain snapshots based on the criteria associated with the selected filter. According to some embodiments, alert filters 224 cause to not be displayed alerts for one or more supply chain situations that are detected by one or more planning and execution systems 160 or will be accounted for in a future planning session. By way of example and not of limitation, prediction system 110 may filter and automatically hide alerts when, for example, the alerts are seen by other systems, alerts are for high manufacturing volumes of items, alerts when safety stock is not null, and the like.

Contextual supply chain data 226 comprises data retrieved by supply chain data processing module 200 to include, for example, data that increases or decreases the probability of occurrence of one or more supply chain failures, data that supplements the supply chain failure predictions, data illustrating various aspects of the variables used to make the supply chain failure predictions, data regarding one or more components of a supply chain and which is associated with a supply chain failure, and/or data used to calculate any of the foregoing or generated from any of the foregoing, including, for example, forecasts, calculations, or statistics generated from historical supply chain data.

By way of example and not of limitation, prediction system 110 is described in the context of an order promising failure for an exemplary tire manufacturer that promises delivery within a short time period (e.g. 48 hours) for local mechanics and acts as if it were a retainer business to account for the limited inventory of the local mechanics.

Continuing with this example, the exemplary tire manufacturer would like to be able to provide the customer with a given tire within two days in Europe. When a customer calls in and asks for a particular tire and is told that the earliest delivery day for delivery is more than two days (i.e. three or more days), that is an order promising failure. These types of failures may be prevented or eliminated with the currently disclosed systems and methods provided that the failure is predicted within a particular critical prediction horizon. On the one hand, the prediction horizon for the system has to be long enough for the supply chain system to enact a corrective action within the supply chain. Accordingly, if the failure is predicted just one day ahead, for example, it would likely be too late for any corrective action to be taken. On the other hand, the prediction horizon should also be shorter than a planning horizon, which would allow for the predicted failure to be captured and corrected by the planning system. At the exemplary tire manufacturer, this means taking these actions 14 to 21 days ahead based on predictions made three weeks in advance. Although the following examples are illustrated by service level failures for an exemplary tire manufacturer, embodiments contemplate the prediction system predicting other supply chain failures, such as, for example, future stock outs and returns for supply chain entities in other manufacturing and retail industries, such as, for example, consumer goods manufacturers, warehouses, and grocery retailers.

Figure 3:
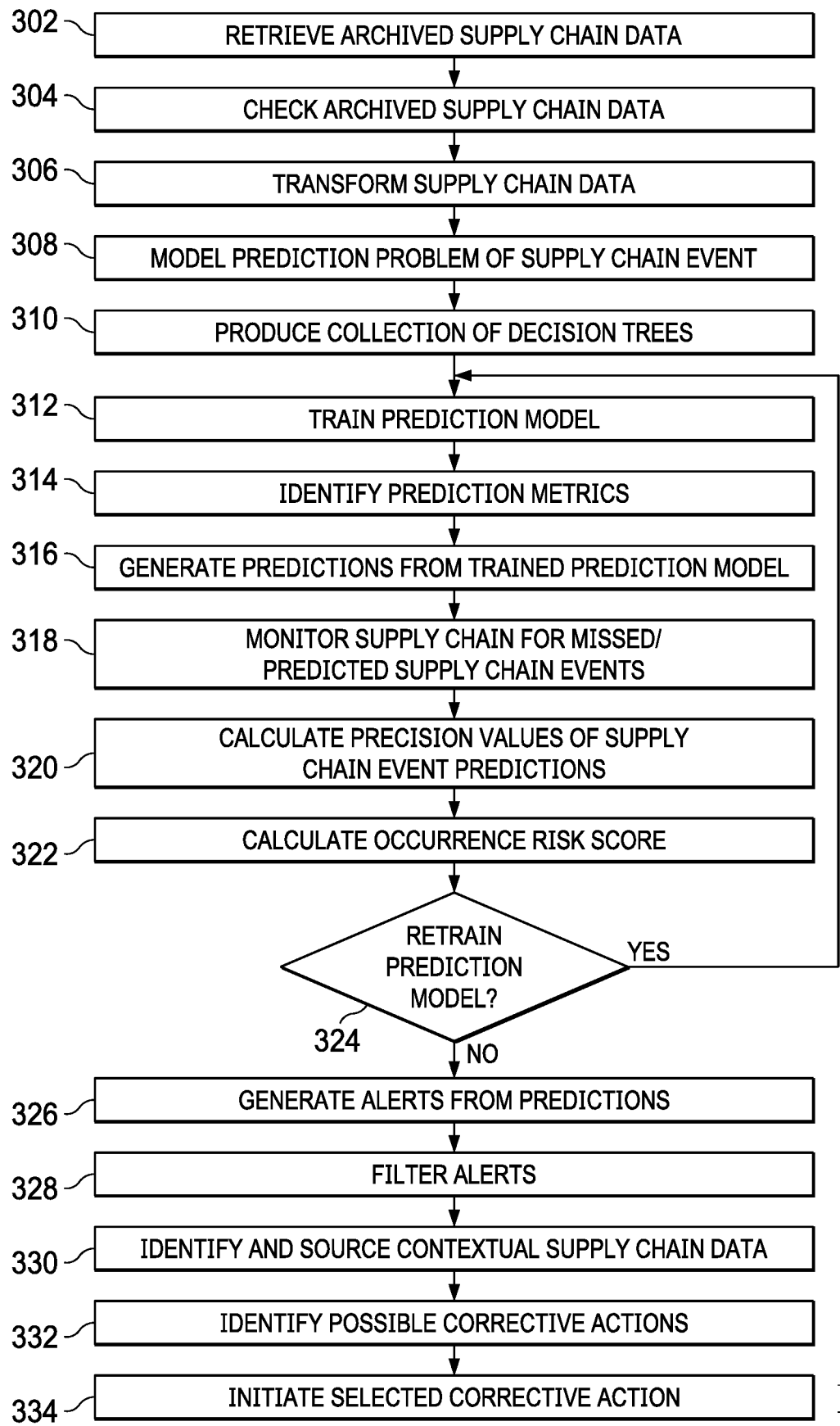
FIG. 3 illustrates a method of supply chain event prediction, in accordance with an embodiment.

FIG. 3 illustrates method 300 for predicting and resolving supply chain events, in accordance with an embodiment. Although actions of method 300 are described in a particular order, embodiments contemplate actions performed in any suitable order or combination according to particular needs.

At action 302, prediction system 110 may retrieve archived supply chain data 210 directly from archiving system 120. Additionally, or in the alternative, prediction system 110 may receive archived supply chain data 210 from archiving system 120 or from one or more systems configured to store or transmit historical supply chain data from one or more planning and execution systems 160.

At activity 304, supply chain data processing module 200 checks archived supply chain data 210 for errors, quality, consistency, and the like. As discussed above, prediction system 110 may check supply chain data for errors in the range, sign, and/or value of the received data and use statistical analysis to check the quality or the correctness of the data.

At activity 306, supply chain data processing module 200 may transform the supply chain data to normalize, aggregate, and/or rescale the supply chain data to allow direct comparison of supply chain data from various planning and execution systems 140. According to embodiments, supply chain data processing module 200 transforms archived supply chain data 210 by one or more of rescaling, normalization, and/or aggregation processes to, for example, aggregate one or more variables (inventory level, forecast, logistics delays, production quantity, etc.) at the same granularity level; express all quantities in terms of a ratio of the original quantity divided by the plan quantity, computation of quantity independent key performance indicators (such as, for example, past service level in % per week), and the like.

According to embodiments, historical supply chain data from one or more planning and execution systems 160 comprise different scopes. For example, a first one of one or more planning and execution systems 160 may store historical supply chain data comprising prediction data with a monthly horizon for one SKU, and a second one of one or more planning and execution systems 160 may store historical supply chain data comprising sales data for one SKU for one distribution center for one day. To compare the data, supply chain data processing module 200 normalizes the data so that both types of data are expressed in terms of time, SKU, and distribution center by, for example, dividing the prediction data by the number of distribution centers. After the data is normalized, the data is rescaled to the same units. Here, the data may be rescaled so that the data is expressed in terms of weeks, SKU, and distribution centers, by, for example, dividing the monthly prediction data into its constituent four weeks, and multiplying or aggregating the daily sales data to represent a seven-day week. After the data is expressed in the same terms, the data may then be aggregated to the level used by the prediction model. In the examples, above, the prediction model is trained with weekly aggregates of data to predict supply chain events for the next three weeks. Accordingly, the rescaled weekly sales and prediction data is aggregated to the monthly level and may then be used to train the prediction model and/or predict supply chain events. Although a particular time period is associated with predicting the supply chain events for a next time periods; embodiments contemplate any time period for predicting any subsequent time period, according to particular needs.

At activity 311, supply chain data processing module 200 determines whether to train the machine learning prediction model. When the machine learning prediction model is trained, method 300 continues to activity 310, otherwise, method 300 continues to activity 316.

At activity 312, machine learning module 202 is trained using archived supply chain data and gradient boosting to improve predictions. In embodiments comprising a gradient boosted trees machine learning model, or other machine learning model, prediction system 110 receives samples of transformed historical supply chain data aggregated at a certain granularity level during a training phase. The granularity level may comprise, for example, data aggregated by item, stocking location, and time period for one or more planning periods, such as, for example, data aggregated by SKU-week, for a planning period of four-weeks. The transformed historical data aggregated at the item-stocking location-week level for the four-week planning period comprises a sample to train the machine learning model. Machine learning computation module 202 uses many snapshots, such as, for example, one or more years' worth of the supply chain data, to train machine learning model to solve the prediction problem by identifying supply chain events during a period subsequent to the period represented by snapshots of the supply chain data. For example, machine learning computation module 202 may train the machine learning model using one or more years of archived supply chain data 210, presented in snapshots comprising smaller time periods of the data, to predict the occurrence of supply chain events during a period subsequent to the snapshot time period.

At activity 310, machine learning computation module 202 processes the historical supply chain training data to solve the classification problem using a machine learning model.

At activity 316, machine learning computation module 202, when presented with snapshots of supply chain data, predicts the occurrence of supply chain events during a period subsequent to the snapshot time period. According to embodiments, machine learning computation module 202 may train the machine learning model using four-week snapshots of supply chain data to predict supply chain events during the three-week period subsequent to the four-week period of the snapshots. According to some embodiments, the prediction phase of the machine learning process is performed at weekly intervals. However, embodiments contemplate shorter prediction phases that may be performed, for example, twice a week, once a day, or the like. In addition, prediction system 110 predicts supply chain events that occur only within a prediction horizon, as described above.

At activity 322, prediction system 110 calculates the occurrence risk score. According to embodiments, prediction system 110 calculates the occurrence risk score for one or more predicted supply chain failures wherein the occurrence risk score, indicates a score of the probability that a predicated supply chain failure will occur. Prediction system 110 may calculate the occurrence risk score based on one or more factors identified during training of the prediction model and which are determined to have predictive power with regard to the occurrence of a particular supply chain failure using, for example, precision/recall or receiver operating characteristics. For example, prediction system 110 may calculate an occurrence risk score as a percentage such as, for example, 74%, and, in addition, indicate which predictive factor contributed the largest amount to the occurrence risk score, such as, for example, "Past Service Level" This indicates that prediction system 110 calculated a score of the probability that this predicted supply chain event will occur with 74% probability based on one or more predictive factors identified during training of the prediction model, of which "Past Service Level" was the predictive factor with the highest contribution to the score.

Figure 4:
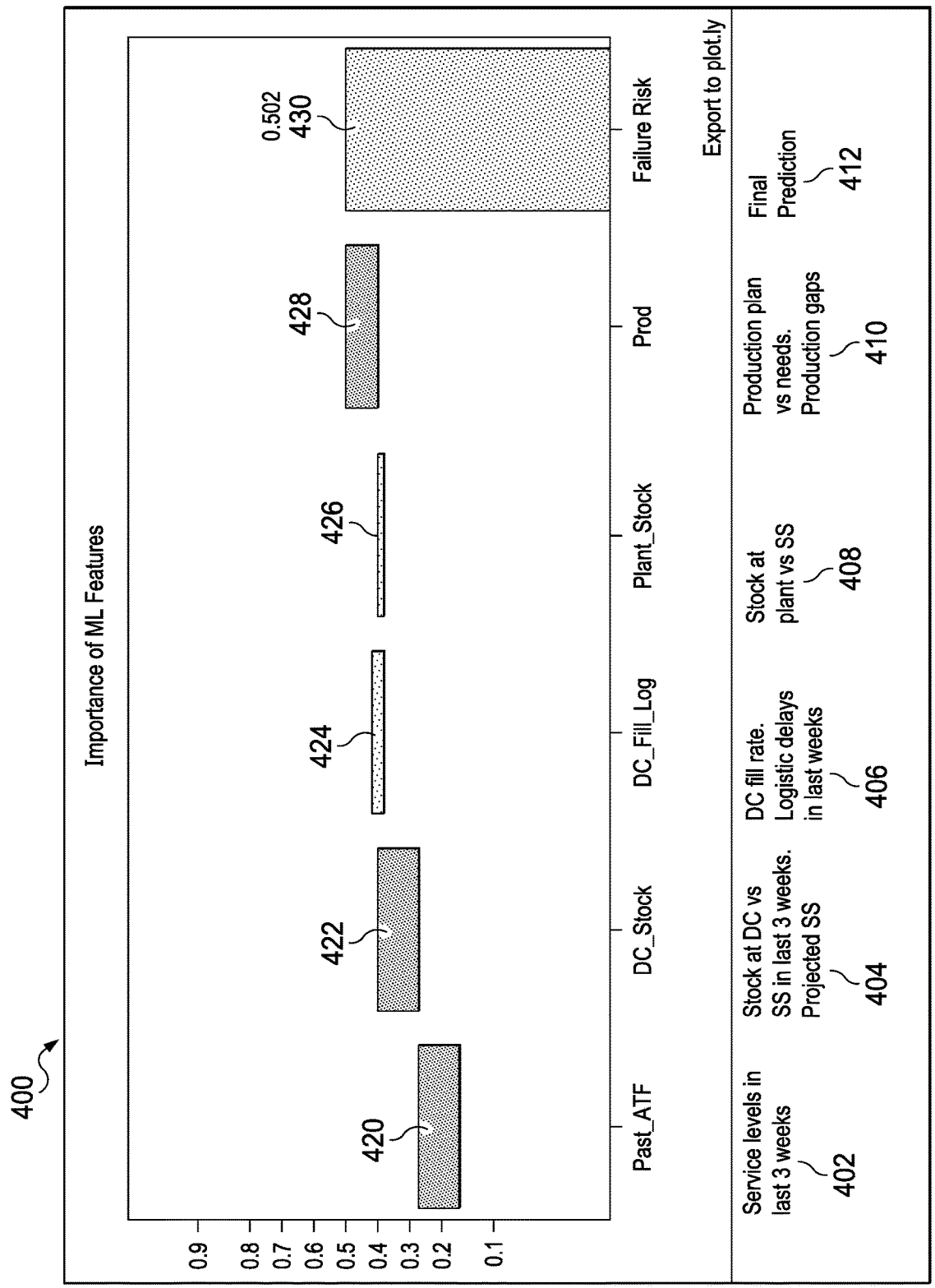
FIG. 4 illustrates an alert features contributions visualization, in more detail according to embodiment.
Figure 5A:
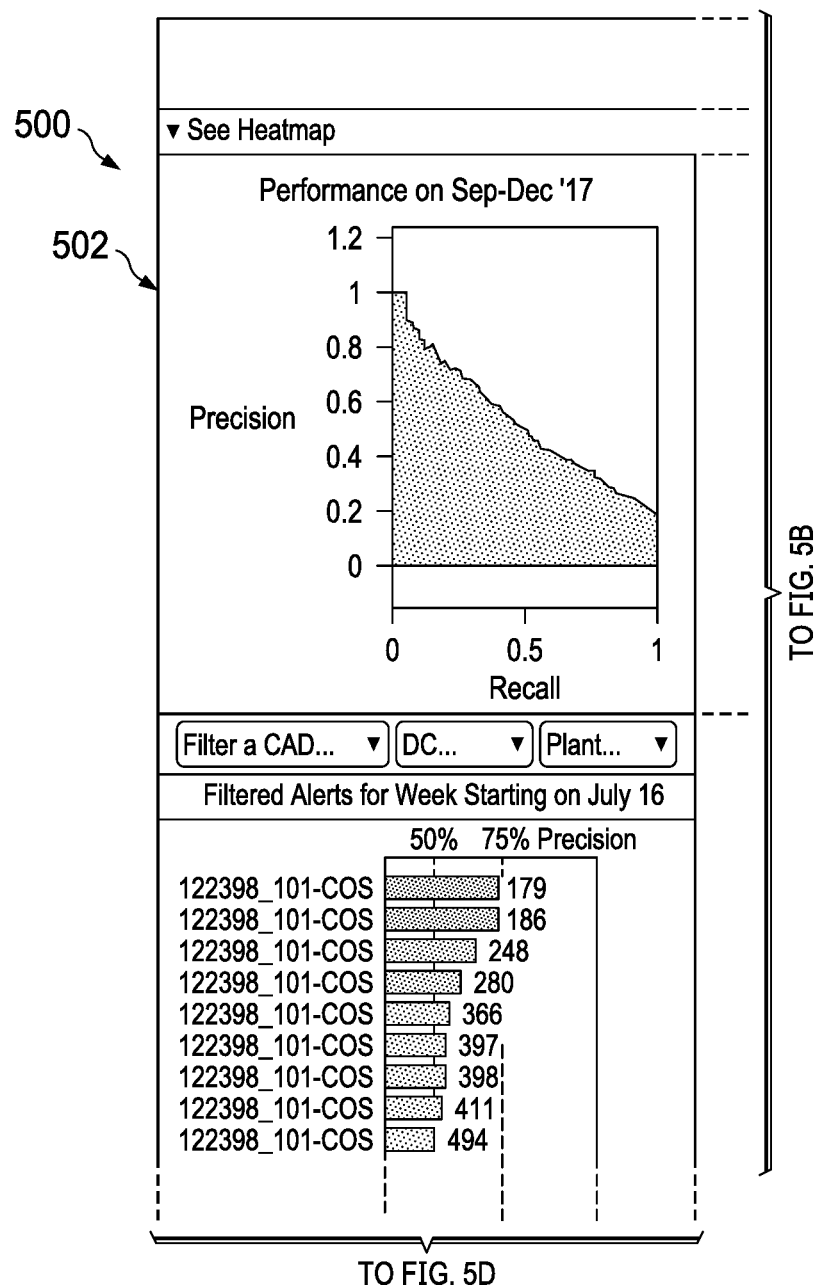
FIG. 5 (depicted as FIGS. 5A through 5F) illustrates a master visualization dashboard, according to an embodiment.
Figure 5B:
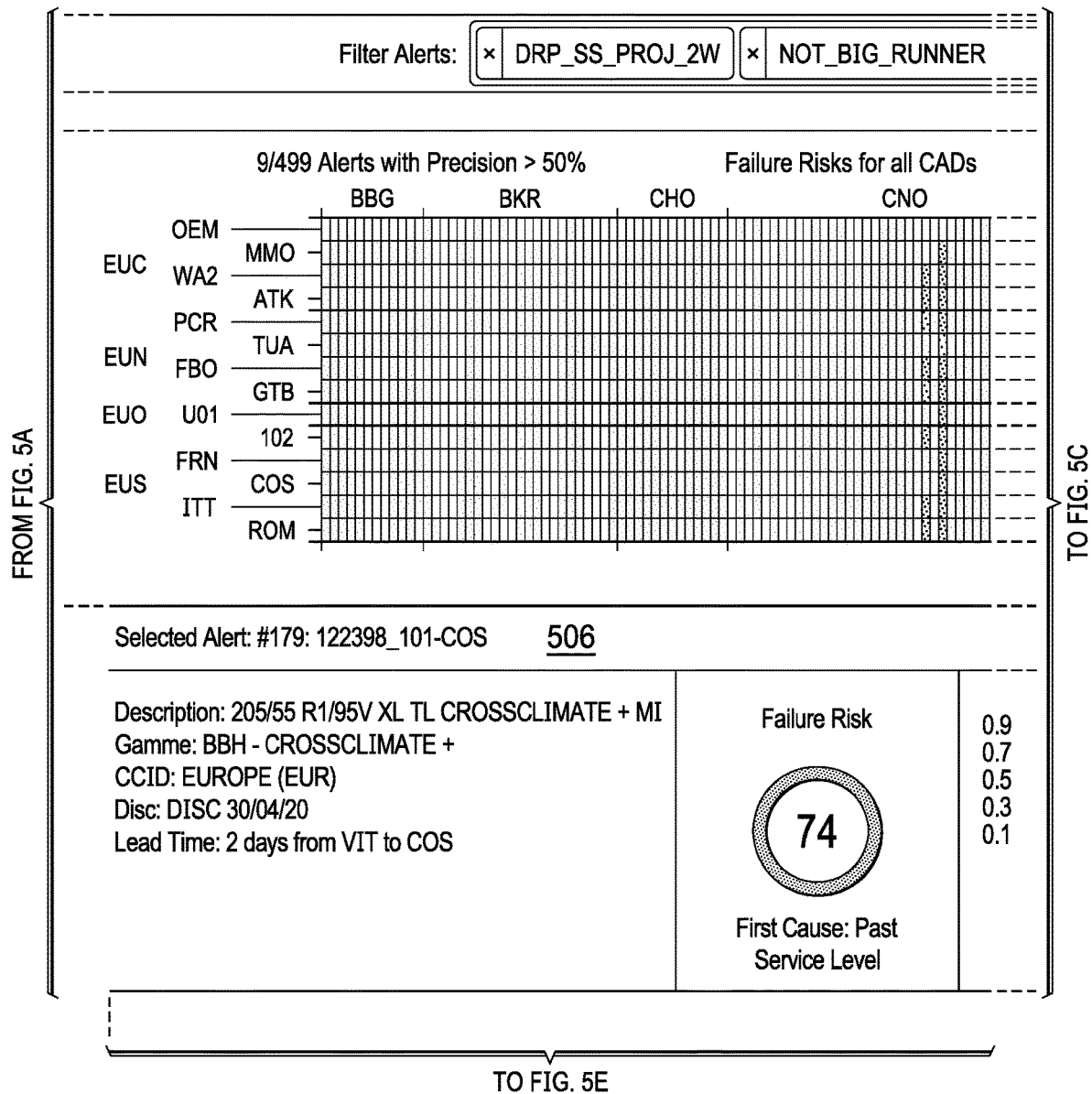
Figure 5C:
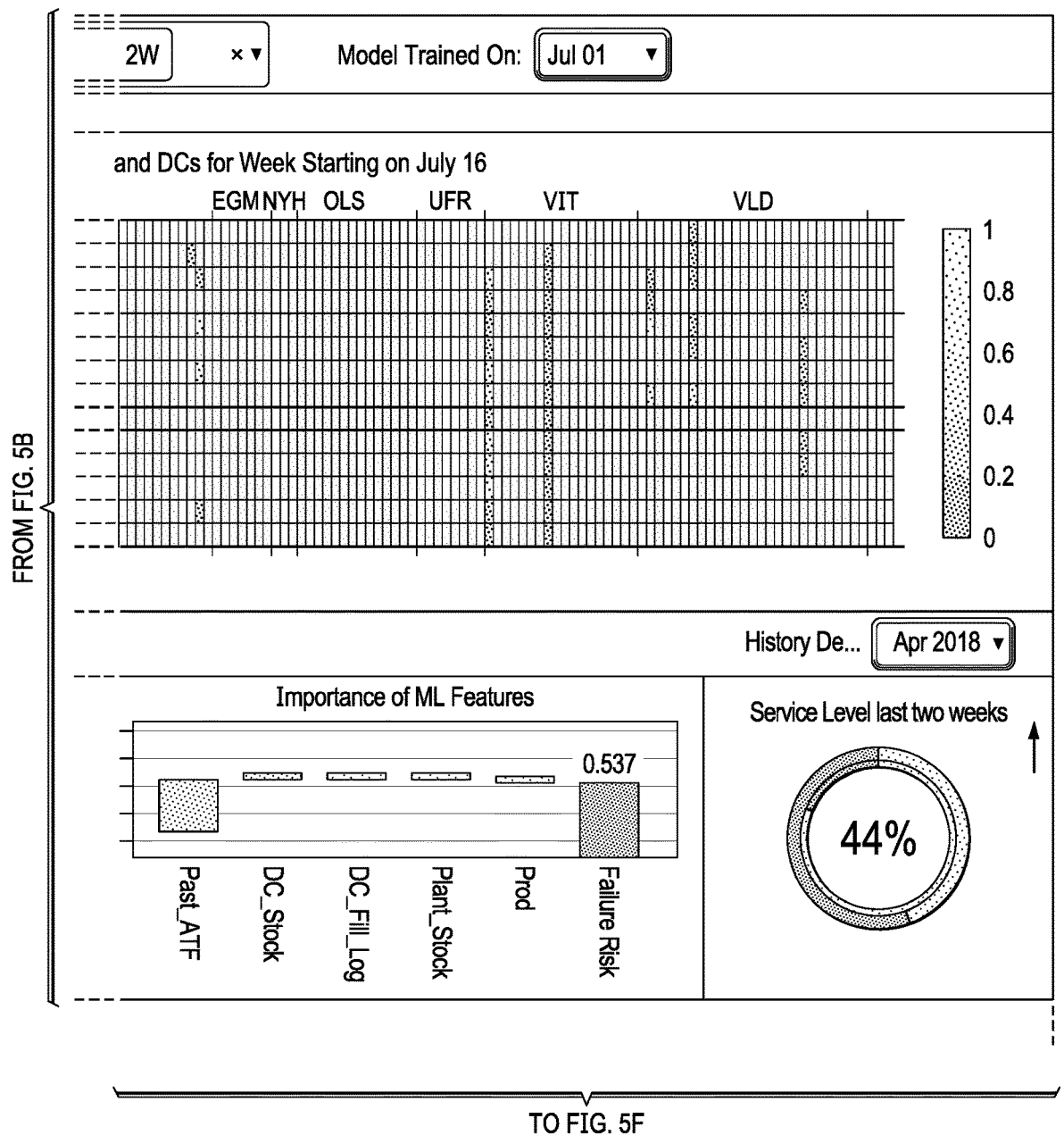
Figure 5D:
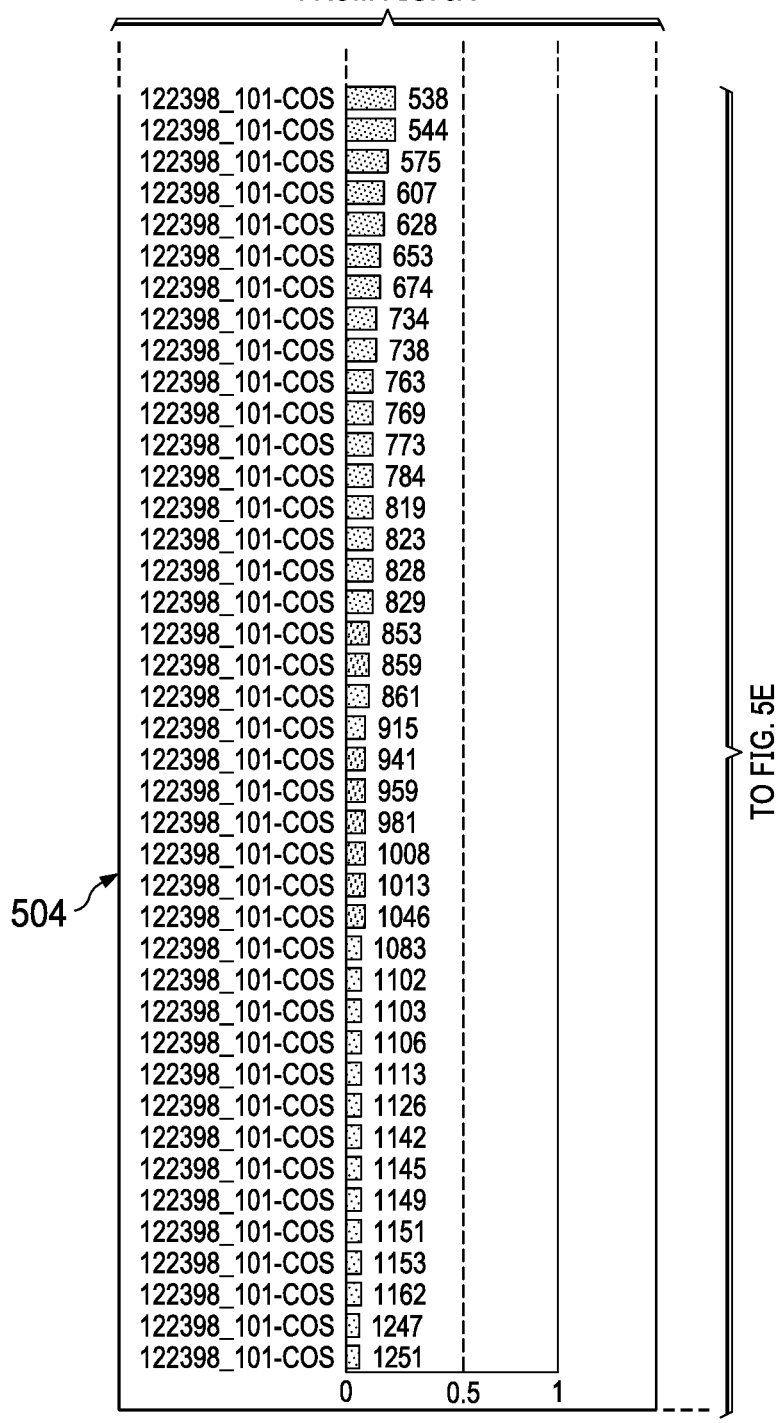
Figure 5E:
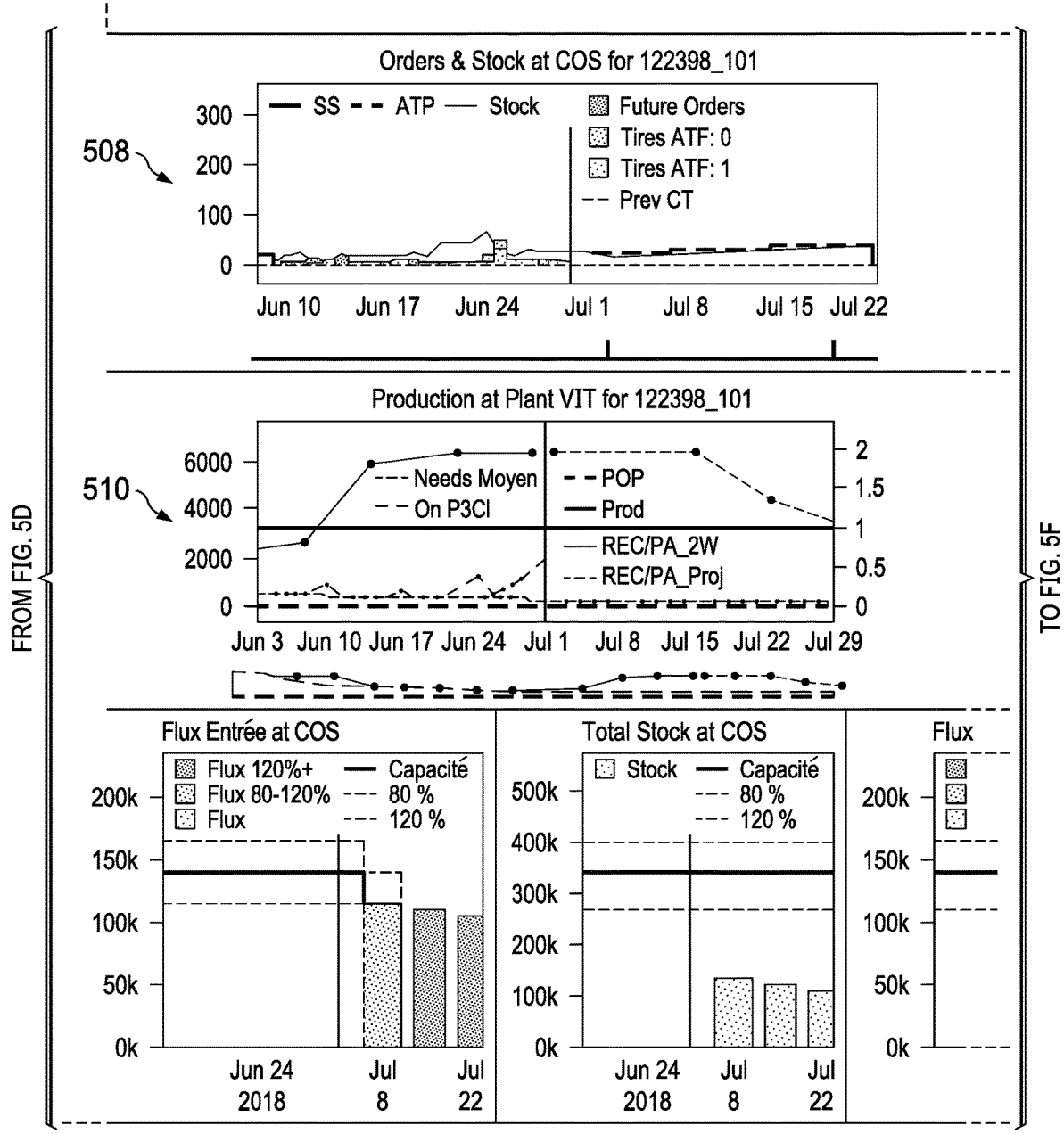
Figure 5F:
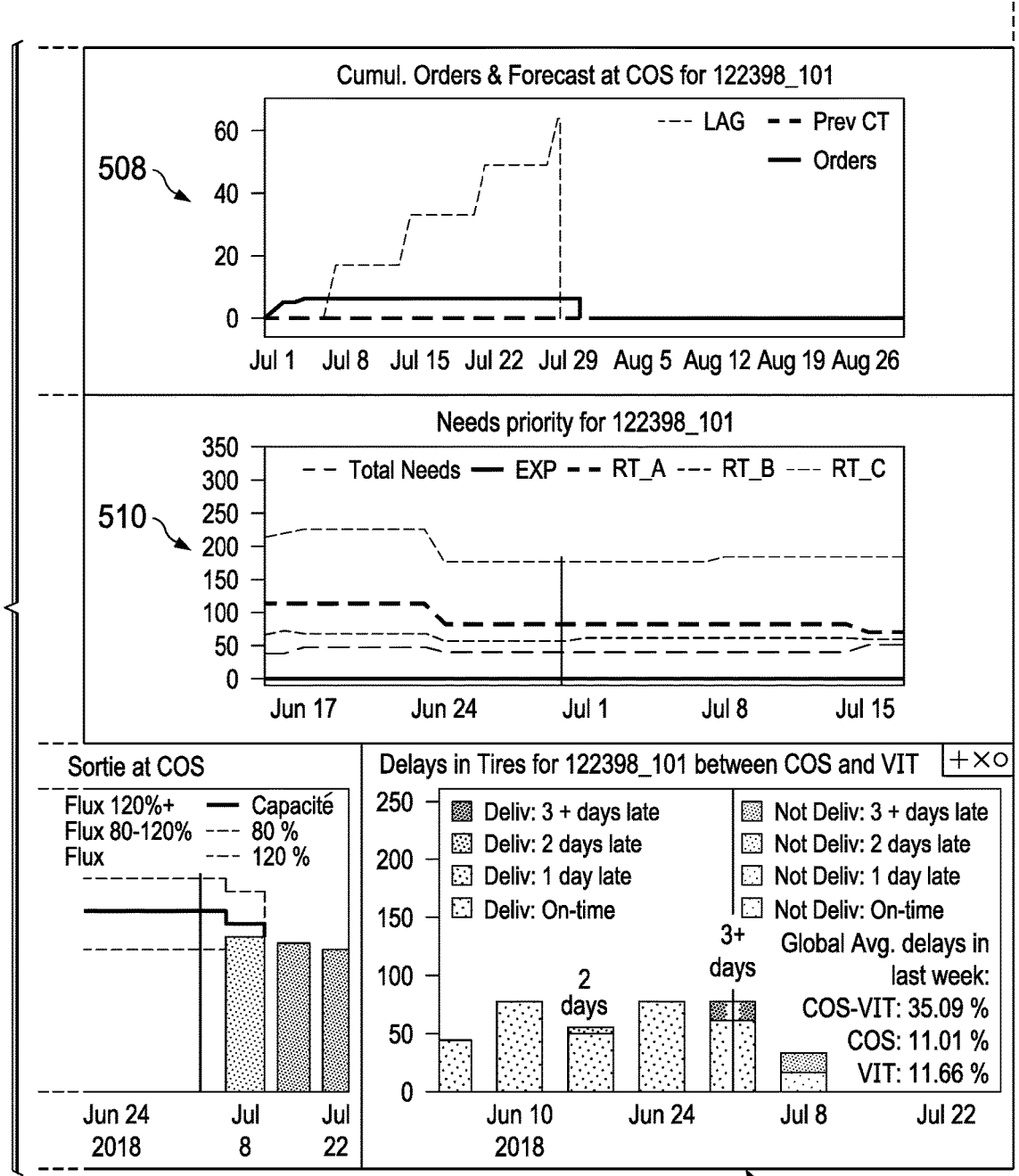

FIG. 4 illustrates features contributions visualization 400, in accordance with an embodiment. Features contributions visualization 400 comprises a visualization of the contribution from one or more predictive factor 402-410 to the overall precision score 412 of the snapshot. According to embodiments comprising an exemplary machine learning prediction model, prediction system 110 identifies, from the historical supply chain data, prediction features 402-410, which are data or data features associated with an increased or decreased probability of occurrence of a supply chain failure, such as, for example, a service level failure. According to embodiments, prediction features may comprise past service level feature 402, stock feature 404, fill rate feature 406, plant stock/safety stock feature 408, and production gaps feature 410. Although particular prediction features are illustrated and described, embodiments contemplate any one or more predictive factors, according to particular needs.

As described above, features contributions visualization 400 displays the contribution from one or more prediction features 402-410 to the overall precision score 412 of the snapshot. One or more prediction features 402-410 comprise measured values from archived supply chain data 210 and/or one or more machine learning features derived from archived supply chain data. 210 According to an embodiment, features contributions visualization 400 comprises a waterfall chart where each of the first five bars represents the contribution of a prediction feature to the calculated value of the precision value 412, which is represented by the sixth bar and is correlated to an occurrence risk score. As described in more detail below, features contributions visualization 400, according to a waterfall chart embodiment, identifies the magnitude and direction of the effect of each of the one or more prediction features 402-410 by the color and size of the bars 420-428 Bars 424-426 having a first color (e.g. green) may represent a positive impact to the precision level while bars of a second color 420-422 and 428 (e.g. red) may represent a negative impact to the precision level. As discussed above, final bar 430 of the waterfall chart may represent a precision level and comprise the cumulative sum of the contributions of each of the prediction features 402-410. By visualizing prediction features 402-410 in this manner, prediction system 110 displays the context of an alert and the factors that contribute to the failure risk, which suggests one or more corrective actions to prevent the supply chain event. However, as discussed below, one or more prediction features 402-410 and the contribution of the one or more features 402-410 to an overall score representing the probability that a failure will occur may be visualized in various different configurations.

To further explain, an example is now given in relation to the exemplary manufacturer. Continuing with this example, first bar 420 represents service level feature 402 comprising the service levels in the last three weeks. In this case, the particular product may not be supplied to the particular distribution center because product tire failed to be supplied correctly from a distribution center for the last three weeks. This may then be a factor that this product will not be supplied on time during the displayed time period. Second bar 422 represents stock feature 404 comprising how much stock is at the distribution center compared with the safety stock for the last three weeks. Whether the projected safety stock is going up or down can give some insight into the stock at the distribution center stock over the next few weeks. Third bar 424 represents fill rate feature 406 comprising the fill rate of the distribution center. In other words, for all of the different products combined, when the distribution center is filled near 100% of capacity, there may be some logistic delay which would be a factor that would increase the overall service level failure risk. For example, when trucks have been late for three weeks in a row, it may impact the future service level. Fourth bar 426 represents plant stock/safety stock feature 408 comprising how much stock is at the manufacturing plant compared with the safety stock for the last three weeks. Whether the stock at the manufacturing plant is going up or down can give some insight into the projected safety stock over the next few weeks. Fifth bar 428 represents production gaps features 410 comprising the production plan compared with the predicted demand. In other words, what is the difference between what is being planned to be produced and what are the actual needs of the supply chain. Finally, and as described above, bars 420-428 represent each of prediction features 402-410 that feed into the overall occurrence risk score which is calculated based on precision value 430 represented by final bar 804. Although particular factors are illustrated, embodiments contemplate other combinations of one or more features 402-410 used to predict the occurrence of a supply chain failure, according to particular needs.

In the illustrated example, final bar 430 of features contributions visualization 400 indicates the overall precision level is 0.502. Based on the precision and recall measurements calculated for the predicative model, an overall precision level of 0.502 was determined to correspond to a probability of occurrence of 74%. For a service level failure, the probability of occurrence is the failure risk score associated with the selected alert. Each of the bars 420-428 illustrates the contributions from the different prediction features 402-410 to the probability the supply chain event will occur. For example, the various contributing factors to the overall prediction may comprise the service level over a preceding time period (here, three weeks), the stock at the distribution center compared with safety stock levels over a preceding time period (here, again a three week period was selected), the distribution center fill rate, the stock of the SKU at the manufacturing plant versus the safety stock, and the amount of product in the production plan versus the needs (i.e. production gaps).

When prediction system 110 uses the trained machine learning prediction model to assess samples of supply chain data to predict supply chain failures, prediction system 110 generates a precision value, comprising a value between 0 and 1, where the closer the value is to 1, the more likely a failure will occur. To derive a probability of failure or failure risk score, prediction system 222 analyzes the past performance of the precision value. For example, during a training of prediction model, prediction system 110 may analyze the prediction failure for a particular threshold precision value. Assuming, for example, precision value is 0.8, and 50% of the sample having a precision value greater than 0.8 correctly predicted failures, the probability of failure may be measured as 50% when operating at a precision value of 0.8. The calculated probability of a failure occurring based on the values of the prediction features is a failure risk score, as described above. In addition, prediction system 110 may generate and display a visualization of the contribution of each prediction feature to the probability that an alert will result in a service level failure, which may be used to identify which supply chain systems need to be adjusted to avoid the service level failure.

At activity 324, prediction system 100 determines whether to retrain the machine learning prediction model. When the machine learning prediction model is retrained, method 300 continues to activity 312, otherwise method 300 proceeds to activity 326. At activity 326, prediction system 110 generates alerts to represent one or more predicted supply chain events. According to embodiments, prediction system 110 analyzes supply chain event predictions 218, and generates alerts for each unique combination of item and stocking location that is predicted to cause a service level failure during the prediction period. Alerts may be generated for each unique item/stocking location combination that is predicted to cause a service level failure, each SKU, or other characteristic or combination of characteristics of predicted supply chain events.

At activity 328, prediction system 110 filters one or more alerts based on various criteria, as described in more detail below. According to embodiments, visualization module 204 of prediction system 110 filters and automatically hides alerts that, for example, will be accounted for in a planning process of the supply chain network 100, represent high manufacturing volumes of items, represent null safety stock, and the like. When prediction system 110 uses a machine learning model, the system may generate alerts for supply chain failures that will be accounted for and resolved by one or more planning and execution systems 160 in the supply chain network 100. For example, when an item is discontinued or a distribution center is closed, visualization module 204 of prediction system 110 may display an alert that stock is lacking at one or more supply chain locations. However, according to some embodiments, visualization module 204 of prediction system 110 may be set to automatically filter and not display any alerts for discontinued items or inactive one or more supply chain entities 150 by applying one or more alert filters 214. Embodiments contemplate, alert filters 214 for displaying alerts for strategic items or strategic distribution centers with a higher importance or priority than alerts for non-strategic items or non-strategic distributions centers. Similarly, one or more alert filters 214 may cause alerts for products with high sales volumes or for priority customers be displayed prior to alerts for products with low sales volumes or for non-priority customers, even if the products with low sales volume products or for non-priority customers have a higher failure risk.

By way of a further example, a manufacturer may have a production capacity problem where total orders exceed supply, but all plants are running at maximum capacity. Visualization module 204 of prediction system 110 may filter and automatically not display the alert 212 for the production capacity problem because the only resolution would be to build additional manufacturing capacity, which is not an actionable event because building additional manufacturing plants may take several years. In other words, visualization module 204 of prediction system 110 may apply alert filter 214 and automatically not display alerts using one or more exclusion rules (which may be user-supplied exclusion rules) for predicted events where the only resolution is not actionable within a practical horizon.

Another type of alert filtering comprises deprioritizing or not displaying alerts that are handled by other supply chain planning systems. In one embodiment, visualization module 204 of prediction system 110 does not display an alert for a predicted service level failure caused by a production planning problem when a production planner will account for the service level failure in a production forecast. In addition, according to some embodiments, when a production planning system will identify when predicted stock is not projected to meet the safety stock, prediction system 110 may filter and not display an alert for a corresponding predicted supply chain event.

At activity 330, prediction system 110 re-enriches prediction results from machine learning computation module 202 with the original supply chain data input and new contextual data, as necessary, to provide visibility on various aspect of the variables used to make the service failure predictions. In addition, visualization module 204 places context around the predicted supply chain failures to illustrate the predictions and identify the cause and solution of the predicted supply chain failure. Embodiments contemplate visualizations showing, for example, which data sources had the most influence on the predictions made by the machine learning model.

At activity 332, prediction system 110 identifies one or more possible corrective actions within the prediction horizon to prevent the supply chain event. By way of example and not of limitation, a supply chain failure may comprise an order promising failure that occurs when a business is unable to deliver an item within a promised time period. Prediction system 110 may prevent order promising failures by identifying one or more corrective actions within the prediction horizon of the prediction model. The prediction horizon comprises a length of time long enough for one or more supply chain entities 150 to enact a corrective action within the supply chain network 100 but shorter than the planning horizon. Accordingly, if the event is predicted just one day ahead, for example, one or more supply chain entities 150 may not have sufficient time to enact any corrective action. On the other hand, the prediction horizon should also be shorter than the planning horizon because any predicted events that happen during the planning period will be captured and corrected by the planning system. At the exemplary tire manufacturer, corrective actions are taken 14 to 21 days ahead of a predicted supply chain event based on predictions made three weeks in advance. Embodiments contemplate lengthier prediction times to provide predictions further in the future; however, in typical supply chain planning practices, two to three weeks represents the appropriate window for correction of failures because longer horizons can be corrected in current planning systems, and shorter horizons are typically too late for corrective actions to prevent the predicted supply chain event. Embodiments contemplate varying the prediction horizon window according to the particular needs of one or more supply chain entities.

At activity 334, prediction system 110 initiates a corrective action to prevent the predicted supply chain failure. According to embodiments, prediction system 110 associated with supply chain network 100 may prevent the predicted supply chain event by initiating a corrective action, such as, instructing automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on one or more predicted supply chain failures, current inventory or production levels, and/or one or more other factors described herein.

FIG. 5 (depicted as FIGS. 5A through 5F) illustrates master visualization dashboard 500, according to an embodiment. As discussed above, visualization module 204 displays alerts indicating whether a supply chain failure (such as, for example, a service level failure) will occur during a prediction period. According to embodiments, master visualization dashboard 500 displays predictions of supply chain failures using one or more visualisations that emphasize supply chain failures with the largest impacts or the highest probability of occurring. Additionally, master visualization dashboard 500 provides contextual information that automatically updates to provide the state of one or more supply chain entities 150 associated with one or more supply chain failures, which provides a centralized system for predicting and determining causes for various supply chain failures without any direct interface with supply chain planning and execution systems 160.

According to embodiments, master visualization dashboard 500 comprises alert prediction overview 502, alert priority visualizer 604, selected alert overview 506, location overview visualization 508, production overview visualization 510, and logistics overview visualization 512, as described in greater detail below.

According to embodiments, master visualization dashboard 500 displays alerts at both alert prediction overview 502 and alert priority visualizer 604. As described in more detail below, visualization module 204 display alerts for supply chain failures using only historical supply chain data. In a typical supply chain network, a production manager would receive alerts from the production system with rules developed in the production system, and logistics manager would receive alerts from the transportation management systems with rules developed in the transportation management system. However, prediction system 110 generates a master visualization dashboard 500 that predicts both production system alerts and transportation management system alerts for an entire supply chain network 100 in a single location, without real-time data or access to the production system rules or the transportation management system rules.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A low-touch centralized system to predict service failure in the supply chain using machine learning, comprising:
  a server comprising a processor and a memory, the server configured to:
    receive only historical supply chain data from an archiving system, the archiving system storing historical supply chain data from a supply chain network comprising one or more supply chain entities, wherein the one or more supply chain entities store one or more items at one or more stocking locations;

aggregate the historical supply chain data to a certain granularity level during a training phase of a gradient boosted trees machine learning model, wherein the aggregated historical supply chain data comprises a sample;

train the gradient boosted trees machine learning model using the sample;

predict one or more supply chain failures during a prediction period by applying a prediction model to a sample of historical supply chain data comprising a sample period earlier than the prediction period; each of the one or more predicted supply chain failures associated with at least one item of the one or more items and at least one stocking location of the one or more stocking locations during a prediction period, wherein the prediction model comprises the gradient boosted trees machine learning model;

calculate an occurrence risk score for at least one of the one or more predicted supply chain failures, the occurrence risk score indicating a possibility that the at least one of the one or more predicted supply chain failures will occur;

determine precision and recall measurements for the prediction model;

determine whether to retrain the gradient boosted trees machine learning model;

calculate a magnitude and a direction of an effect one or more prediction features have on the occurrence risk score;

generate one or more alerts for the one or more supply chain events, each of the one or more alerts representing an output value whose metrics indicate a threshold of greater than 50% chance of occurring associated with at least one alert supply chain event of the one or more supply chain events, the one or more alerts comprising at least one alert item and at least one alert stocking location, the at least one alert item identifying the at least one item of the at least one alert supply chain event and the at least one alert stocking location identifying the at least one stocking location of the at least one alert supply chain event;

provide one or more tools for initiating one or more corrective actions to be undertaken in order to resolve one or more underlying causes of the at least one alert supply chain event; and initiate the one or more corrective actions by instructing automated machinery to produce one or more products based, at least in part, on the one or more predicted supply chain failures.

2. The system of claim 1, wherein the server is further configured to:
identify the one or more prediction features relied on by the prediction model to generate the occurrence risk score, the one or more prediction features associated with one or more supply chain features.

3. The system of claim 2, wherein the server is further configured to:
calculate a precision value of the selected alert for the supply chain event, the precision value indicating a probability the supply chain event will occur based on the past performance of the prediction model for predicting the supply chain event.

4. The system of claim 3, wherein the prediction model comprises a gradient boosted trees machine learning model, and the prediction period and an amount of time for completing one or more corrective actions are less than a planning horizon.

5. The system of claim 4, wherein the supply chain event is a service level failure, and the occurrence risk score is a failure risk score.

6. The system of claim 5, wherein the server is further configured to:
identify one or more properties of the one or more alerts;
receive a filter comprising one or more criteria;
detect each of the one or more alerts having one or properties corresponding to the one or more criteria of the filter; and
filter each of the one or more alerts detected as having one or more properties corresponding to the one or more criteria of the filter.

7. The system of claim 6, wherein the properties of the one or more alerts comprises the one or more underlying causes of the at least one alert supply chain failure, the one or more underlying causes comprises a production planning problem, and the one or more corrective actions to be taken in order to prevent the one or more underlying causes comprises a time period shorter than a production planning horizon.

8. A method for predicting service failures in the supply chain using machine learning, comprising:
receiving, by a server having a processor and a memory, only historical supply chain data from an archiving system, the archiving system storing historical supply chain data from a supply chain network comprising one or more supply chain entities, wherein the one or more supply chain entities store one or more items at one or more stocking locations;

aggregating, by the server, the historical supply chain data to a certain granularity level during a training phase of a gradient boosted trees machine learning model, wherein the aggregated historical supply chain data comprises a sample;

training, by the server, the gradient boosted trees machine learning model using the sample;

predicting, by the server, one or more supply chain failures during a prediction period by applying a prediction model to a sample of historical supply chain data comprising a sample period earlier than the prediction period; each of the one or more predicted supply chain failures associated with at least one item of the one or more items and at least one stocking location of the one or more stocking locations during a prediction period, wherein the prediction model comprises the gradient boosted trees machine learning model;

calculating, by the server, an occurrence risk score for at least one of the one or more supply chain events, the occurrence risk score indicating a possibility that the at least one of the one or more supply chain events will occur;

determining, by the server, precision and recall measurements for the prediction model;

determining, by the server, whether to retrain the gradient boosted trees machine learning model;

calculating a magnitude and a direction of an effect one or more prediction features have on the occurrence risk score;

generating, by the server, one or more alerts for the one or more supply chain events, each of the one or more alerts representing an output value whose metrics indicate a threshold of greater than 50% chance of occurring associated with at least one alert supply chain event of the one or more supply chain events, the one or more alerts comprising at least one alert item and at least one alert stocking location, the at least one alert item identifying the at least one item of the at least one alert supply chain event and the at least one alert stocking location identifying the at least one stocking location of the at least one alert supply chain event;

providing, by the server, one or more tools for initiating one or more corrective actions to be undertaken in order to resolve one or more underlying causes of the at least one alert supply chain event; and initiating, by the server, the one or more corrective actions by instructing automated machinery to produce one or more products based, at least in part, on the one or more predicted supply chain failures.

9. The method of claim 8, further comprising:

identifying, by the server, the one or more prediction features relied on by the prediction model to generate the occurrence risk score, the one or more prediction features associated with one or more supply chain features.

10. The method of claim 9, further comprising:

calculating, by the server, a precision value of the selected alert for the supply chain event, the precision value indicating a probability the supply chain failure will occur based on the past performance of the prediction model for predicting the supply chain event.

11. The method of claim 10, wherein the prediction model comprises a gradient boosted trees machine learning model, and the prediction period and an amount of time for completing one or more corrective actions are less than a planning horizon.

12. The method of claim 11, wherein the supply chain event is a service level failure, and the occurrence risk score is a failure risk score.

13. The method of claim 12, further comprising:

identifying, by the server, one or more properties of the one or more alerts;

receiving, by the server, a filter comprising one or more criteria;

detecting, by the server, each of the one or more alerts having one or properties corresponding to the one or more criteria of the filter; and filtering, by the server, each of the one or more alerts detected as having one or more properties corresponding to the one or more criteria of the filter.

14. The method of claim 13, wherein the properties of the one or more alerts comprises the one or more underlying causes of the at least one alert supply chain event, the one or more underlying causes comprises a production planning problem, and the one or more corrective actions to be taken in order to prevent the one or more underlying causes comprises a time period shorter than a production planning horizon.

15. A non-transitory computer-readable medium embodied with software for a low-touch centralized system to predict service failure in the supply chain using machine learning, the software when executed configured to:

receive only historical supply chain data from an archiving system, the archiving system storing historical supply chain data from a supply chain network comprising one or more supply chain entities, wherein the one or more supply chain entities store one or more items at one or more stocking locations;

aggregate the historical supply chain data to a certain granularity level during a training phase of a gradient boosted trees machine learning model, wherein the aggregated historical supply chain data comprises a sample;

train the gradient boosted trees machine learning model using the sample;

predict one or more supply chain events during a prediction period by applying a prediction model to a sample of historical supply chain data comprising a sample period earlier than the prediction period; each of the one or more supply chain events associated with at least one item of the one or more items and at least one stocking location of the one or more stocking locations during a prediction period, wherein the prediction model comprises the gradient boosted trees machine learning model;

calculate an occurrence risk score for at least one of the one or more supply chain events, the occurrence risk score indicating a possibility that the at least one of the one or more supply chain events will occur;

determine precision and recall measurements for the prediction model;

determine whether to retrain the gradient boosted trees machine learning model;

calculate a magnitude and a direction of an effect one or more prediction features have on the occurrence risk score;

generate one or more alerts for the one or more supply chain events, each of the one or more alerts representing an output value whose metrics indicate a threshold of greater than 50% chance of occurring and associated with at least one alert supply chain event of the one or more supply chain events, the one or more alerts comprising at least one alert item and at least one alert stocking location, the at least one alert item identifying the at least one item of the at least one alert supply chain event and the at least one alert stocking location identifying the at least one stocking location of the at least one alert supply chain event;

provide one or more tools for initiating one or more corrective actions to be undertaken in order to resolve one or more underlying causes of the at least one alert supply chain event; and initiate the one or more corrective actions by instructing automated machinery to produce one or more products based, at least in part, on the one or more predicted supply chain events.

16. The non-transitory computer-readable medium of claim 15, wherein the software when executed is further configured to:

identify the one or more prediction features relied on by the prediction model to generate the occurrence risk score, the one or more prediction features associated with one or more supply chain features.

17. The non-transitory computer-readable medium of claim 16, wherein the software when executed is further configured to:

calculate a precision value of the selected alert for the supply chain event, the precision value indicating a probability the supply chain event will occur based on the past performance of the prediction model for predicting the supply chain event.

18. The non-transitory computer-readable medium of claim 17, wherein the prediction model comprises a gradient boosted trees machine learning model, and the prediction period and an amount of time for completing one or more corrective actions are less than a planning horizon.

19. The non-transitory computer-readable medium of claim 18, wherein
the supply chain event is a service level failure, and the occurrence risk score is a failure risk score.

20. The non-transitory computer-readable medium of claim 19, wherein
the software when executed is further configured to:
identify one or more properties of the one or more alerts;
receive a filter comprising one or more criteria;
detect each of the one or more alerts having one or properties corresponding to the one or more criteria of the filter; and
filter each of the one or more alerts detected as having one or more properties corresponding to the one or more criteria of the filter.

* * * * *